US012051076B2

(12) United States Patent
Johnsen et al.

(10) Patent No.: US 12,051,076 B2
(45) Date of Patent: Jul. 30, 2024

(54) SYSTEM AND METHOD FOR ASSESSING CUSTOMER SERVICE TIMES

(71) Applicants: Robert Johnsen, North Bergen, NJ (US); Robert Laganiere, Gatineau (CA)

(72) Inventors: Robert Johnsen, North Bergen, NJ (US); Robert Laganiere, Gatineau (CA)

(73) Assignee: TEMPO ANALYTICS INC. (CA)

(*) Notice: Subject to any disclaimer, the term of this patent is extended or adjusted under 35 U.S.C. 154(b) by 687 days.

(21) Appl. No.: 16/479,251

(22) PCT Filed: Jan. 19, 2018

(86) PCT No.: PCT/CA2018/050067
§ 371 (c)(1),
(2) Date: Jul. 19, 2019

(87) PCT Pub. No.: WO2018/132923
PCT Pub. Date: Jul. 26, 2018

(65) Prior Publication Data
US 2019/0385173 A1 Dec. 19, 2019

Related U.S. Application Data

(60) Provisional application No. 62/448,725, filed on Jan. 20, 2017.

(51) Int. Cl.
*G06Q 30/016* (2023.01)
*G06V 20/52* (2022.01)
*G07C 1/10* (2006.01)

(52) U.S. Cl.
CPC .......... *G06Q 30/016* (2013.01); *G06V 20/53* (2022.01); *G07C 1/10* (2013.01)

(58) Field of Classification Search
CPC ......... G06Q 30/016; G06V 20/53; G07C 1/10
See application file for complete search history.

(56) References Cited

U.S. PATENT DOCUMENTS 8,098,888 B1 * 1/2012 Mummareddy ....... G06V 20/53
382/103
8,209,219 B2 * 6/2012 Fitzpatrick ............. G06Q 30/06
705/7.29

(Continued)

OTHER PUBLICATIONS

Patent Cooperation Treaty (PCT), International Search Report and Written Opinion for Application PCT/CA2018/050067 filed Jan. 19, 2018, mailed Apr. 16, 2018, International Searching Authority, CA.

(Continued)

*Primary Examiner* — Kenny A Cese
(74) *Attorney, Agent, or Firm* — McDonald Hopkins LLC

(57) ABSTRACT

Systems and methods for measuring service times at a retail establishment. One or more video cameras are coupled to data processors. The video frames from the video cameras are analyzed to detect a customer at the service counter and, at the detection of a specific event, a timer is started. The customer detected at the service counter is then tracked through various video frames until the customer has left or is about to leave. The timer is then stopped and the elapsed time is stored. The retail establishment may be a quick service restaurant and various video and image processing methods may be used to detect, track, and recognize the customer.

13 Claims, 5 Drawing Sheets

(56) References Cited

U.S. PATENT DOCUMENTS

| | | | | |
|---|---|---|---|---|
| 9,124,778 | B1* | 9/2015 | Crabtree | G08B 13/19671 |
| 10,217,120 | B1* | 2/2019 | Shin | H04W 4/02 |
| 10,262,331 | B1* | 4/2019 | Sharma | H04L 67/22 |
| 10,387,896 | B1* | 8/2019 | Hershey | H04N 23/90 |
| 10,602,080 | B2* | 3/2020 | Hagisu | G06V 20/53 |
| 10,614,436 | B1* | 4/2020 | Sharma | G06K 9/6218 |
| 2006/0218057 | A1 | 9/2006 | Fitzpatrick et al. | |
| 2007/0183634 | A1* | 8/2007 | Dussich | G06V 40/173 |
| | | | | 382/118 |
| 2010/0067742 | A1* | 3/2010 | Ogawa | G06V 10/462 |
| | | | | 382/103 |
| 2013/0030874 | A1* | 1/2013 | Lin | G06Q 10/06 |
| | | | | 705/7.38 |
| 2014/0222479 | A1 | 8/2014 | Hirakawa et al. | |
| 2014/0222501 | A1* | 8/2014 | Hirakawa | G06Q 50/12 |
| | | | | 705/7.29 |
| 2014/0316915 | A1 | 10/2014 | Hickey | |
| 2015/0006263 | A1* | 1/2015 | Heier | G06Q 10/06398 |
| | | | | 705/7.42 |
| 2015/0120237 | A1* | 4/2015 | Gouda | G01C 21/00 |
| | | | | 702/150 |
| 2017/0278137 | A1* | 9/2017 | Burke | G06F 16/784 |
| 2018/0075461 | A1* | 3/2018 | Hirakawa | G06Q 30/0269 |

OTHER PUBLICATIONS

Baltieri, D., Vezzani, R., Chucchiara, R., "Mapping Appearance Descriptors on 3D Body Models for People Re-Identification". Int J Comput Vis;111(3):345-364, Jul. 22, 2014. DOI: 10.1007/S11263-014-0747-Z.

Extended European Search Report issued on corresponding European Patent App. No. 18741892.6. 11 pages. Mailed Jun. 21, 2023.

* cited by examiner

SYSTEM AND METHOD FOR ASSESSING CUSTOMER SERVICE TIMES

CROSS REFERENCE TO RELATED APPLICATIONS

This application is a 35 U.S.C. 371 national stage filing and claims priority to International Application No. PCT/CA2018/050067 filed on Jan. 19, 2018 entitled "SYSTEM AND METHOD FOR ASSESSING CUSTOMER SERVICE TIMES," which claims the benefit of U.S. Provisional Application No. 62/448,725 on Jan. 20, 2017, each of which are incorporated herein by reference in their entirety.

TECHNICAL FIELD

The present invention relates to customer service delivery. More specifically, the present invention relates to systems and methods for assessing levels of customer service and the speed of customer service.

BACKGROUND

Those in the QSR industry seek to differentiate themselves on several axes: cuisine, quality of food, price, facilities, and customer service. One element of customer service that is thought to add to customer satisfaction is speed of service. It is thought that the faster a customer can receive service, the more likely that customer will be satisfied with the restaurant and the more likely that customer will be to patronize the restaurant or other outlets of the restaurant brand frequently.

Most restaurants in the QSR industry serve customers that physically enter the restaurant and seek service at a front counter. Many restaurants also offer drive-through service which allows customers to place orders while in their cars and receive products delivered to them through a service window. Most QSR brands have speed of service standards that they expect their outlets to meet, on the average, for both front counter and drive-through transactions.

A number of systems and methods have been proposed for timing various activities in the context of a drive-through, using cameras located in the exterior of a commercial establishment. Systems and methods for tracking movement of vehicles and timing drive-through transactions, but not human customers in the interior of the commercial establishment, are described in U.S. Patent Application Publication Nos. US 2014/0121830 and US 2014/0063263. One process for measuring service times in a drive-through setting involves use of a sensor installed in the pavement under the menu board outside of the restaurant. When a car reaches the menu board, a timer activates, and does not stop until a second metal sensor detects that the customer has left the service window. Additional ways to improve customer experience in drive through ordering are described in, e.g., U.S. Pat. Nos. 5,053,868 and 5,168,354, which provide for cameras located on both the exterior menu board and the drive-through window for monitoring customer experience.

Measuring speed of service in the interior of a QSR, however, typically requires an employee standing near the front counter and manually measuring service time. The manual method is associated with a number of drawbacks. First, it is not economical to dedicate an employee solely to the task of measuring speed of service at all times. Also, many restaurants have multiple service points at the front counter, requiring multiple employees to be dedicated to the task of measuring service times during peak sales hours. In addition, the manual method is susceptible to human error.

U.S. Pat. No. 8,254,625 proposes a device that detects presence of a customer in an area of interest and emits a signal alerting employees to the presence of the customer to avoid a long wait time. However, the data captured by this method does not provide information about service speed. U.S. Pat. No. 7,482,927 teaches a combination-surveillance-alert system in a take-out restaurant. In accordance with the method of the '927 patent, an image recognition program obtains images from a video camera monitoring a parking space, and triggers a controller to start a timer, and alerts an employee when entry of a vehicle into the parking space is detected. The image recognition program also detects when the vehicle leaves the parking space, and the controller prepares a total service time report for management. Similar to systems adapted for drive-through, which are not applicable to a QSR front counter where human customers move about freely, the time frame measured in the system of the '927 patent is based on entry and exit of vehicles to and from a designated area.

U.S. Patent Application Publication No. US 2013/0030874 provides a system and method of measuring order fulfillment times in a fast food restaurant setting, which uses video cameras to generate sequences of images of the fulfillment process. In this proposed system, time intervals to fulfillment are determined and stored. Average time intervals to fulfillment based on multiple fulfillment records, but not individual time intervals, are generated.

In promotional materials published by DTT Surveillance of Los Angeles Calif., for a service named "MyDTT™", it is stated that "[w]hile other system may provide average transaction times, MyDTT™ shows how long a customer waited to receive their entrée . . . and how long it took to check out . . . [u]sing cameras as data collection points. . . . " The promotional materials generally suggest that MyDTT™ can be used in QSR, but provides little detail concerning, e.g., placement of cameras, database management of images acquired by the cameras, etc.

Additional systems and methods which use video cameras to acquire data for analyzing or for improving restaurant operations are described in U.S. Patent Application Publication Nos. US 2005/0154560 (managing food inventory), US 2011/0087535 (detecting improper or fraudulent activity by customers or employees), US 2015/0088594 (identifying alert conditions in restaurant operations), Japanese Patent Publication No. 2012-14567 (optimizing seating arrangements in self-service restaurants), and Japanese Patent Publication No. 2014-149686 (detecting customers who give up self-service). The subject matter of these publications can be distinguished from the invention described herein, in that they do not measure service time in a commercial establishment and they do not provide related information to be used by management for evaluating service speed and effectiveness of customer service procedures.

From the above, there is therefore a need for systems and methods for assessing customer service delivery levels and customer service delivery times. Preferably, such systems and methods are suitable for providing management and efficiency experts with suitable data that can be used to develop and/or improve customer service not just at QSR establishments but at other establishments that provide service to customers.

SUMMARY

The present invention provides systems and methods for measuring service times at a retail establishment. One or more video cameras are coupled to data processors. The video frames from the video cameras are analyzed to detect a customer at the service counter and, at the detection of a specific event, a timer is started. The customer detected at the service counter is then tracked through various video frames until the customer has left or is about to leave. The timer is then stopped and the elapsed time is stored. The retail establishment may be a quick service restaurant and various video and image processing methods may be used to detect, track, and recognize the customer.

This application relates to systems and methods for measuring services times in the interior of a commercial establishment, in particular, in a quick service restaurant (QSR), more commonly known as a fast food restaurant. Methods and systems are provided for timing transactions and service fulfillment times by using one or more cameras, an image storage database or connection to internet/cloud, and modules for people detection, people re-identification, and action recognition.

In one aspect, the present invention provides a system for determining a time for delivering service to customers, the system comprising:
  at least one video camera having a field of view encompassing a service counter;
  at least one data processor for executing computer readable and computer executable instructions stored on computer readable media, said at least one data processor implementing a method when said instructions are executed, said method comprising:
    a) continuously receiving multiple video frames from said at least one video camera;
    b) determining that a customer is at said service counter;
    c) determining characteristics of said customer;
    d) tracking said customer across different video frames from said at least one video camera;
    e) determining that said customer has completed receiving service;
    f) determining an elapsed time between steps b) and e).

In another aspect, the present invention provides a method for determining a time for delivering service to a customer at a service counter, the method comprising:
  a) at a data processor, continuously receiving multiple video frames from said at least one video camera;
  b) processing said video frames to determine that a customer is at said service counter;
  c) determining characteristics of said customer at said service counter;
  d) tracking said customer across different video frames from said at least one video camera;
  e) determining that said customer has completed receiving service;
  f) determining an elapsed time between steps b) and e).

Non-transitory computer readable media having encoded thereon computer readable and computer executable instructions that, when executed, implements a method for determining a time for delivering service to a customer at a service counter, the method comprising:
  a) at a data processor, continuously receiving multiple video frames from said at least one video camera;
  b) processing said video frames to determine that a customer is at said service counter;
  c) determining characteristics of said customer at said service counter;
  d) tracking said customer across different video frames from said at least one video camera;
  e) determining that said customer has completed receiving service;
  f) determining an elapsed time between steps b) and e).

BRIEF DESCRIPTION OF THE DRAWINGS

The embodiments of the present invention will now be described by reference to the following figures, in which identical reference numerals in different figures indicate identical elements and in which.

DETAILED DESCRIPTION

Terms

Figure 1:
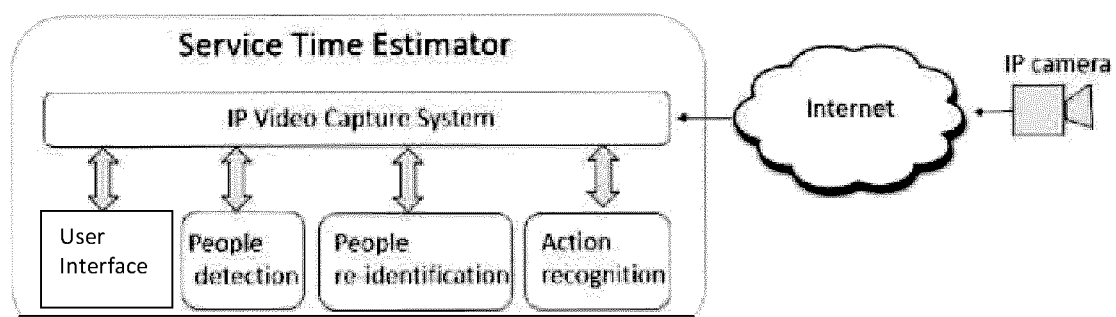
FIG. 1 shows the basic system architecture according to one embodiment of the present invention.

As used herein, and unless stated otherwise, each of the following terms shall have the definition set forth below.

As used herein, "Re-identification" of a customer occurs when a customer image obtained by the one or more cameras is determined to have a match score at or above a threshold match score with a customer image in a database associated with that customer.

As used herein, a "match score" between two images reflects the degree of similarity between the two images. The match score can be determined based on various factors, e.g., color, geometry, texture, or a combination thereof. A high match score indicates that the two images compared are highly similar. A lower match score indicates that the two images compared are less similar.

Where a database comprises a plurality of customer images, a comparison between a newly obtained customer image and those in the database will generate a plurality of match scores. The "maximum match score" means the match score having the highest value among the plurality of match scores generated. Of course, if the database consists of only one customer image, a comparison between the newly obtained image and that in the database will generate a single match score, which should be considered the maximum match score.

As used herein, a "threshold match score" is the match score value which determines whether two images are sufficiently similar to conclude that they are of the same object (human customer). The threshold match score can be invariably set by the system upon installation, or can be variable depending on user requirement/input.

As used herein, a "preset amount of time" is a time period which can be any set timespan which is applicable to the particular location or business type. Examples of such preset amount of time, e.g., 10 minutes, given in this application serve only as examples, and are not intended to limit the scope of this term to any particular value. The preset amount of time can be invariably set by the system upon installation, or can be variable depending on user requirement/input.

As used herein, a "service fulfillment" means completion of an order. For clarity, "service fulfillment" can also mean the occurrence when a customer who has previously placed an order has received said order and is no longer waiting on the business to further act on said order. Clearly, the meaning of service fulfillment will depend on the type of business. In the context of a fast food restaurant, a service fulfillment event can be the action of picking up food by a customer. In a related matter, an "image associated with service fulfillment" is an image which is determined by an action recognition module as showing service fulfillment. In a fast food restaurant, an image associated with service fulfillment can be an image showing a customer picking up his or her food order.

As used herein, a "subsequent service time" associated with a customer means the point in time (not a timespan) when the customer is re-identified. For clarity, the timer/chronometer is not stopped upon the recording of a subsequent service time. Thus, if a customer has been identified at time A as placing an order and is outside the field of view at time B and is then re-identified at time C, the timer is not stopped at time B. If the customer is recorded as leaving/picking up his/her order at time D, then the service time is calculated to be the amount of time elapsed between times A and D. The "subsequent service times" for this example would be times B, C, and D.

In accordance with an embodiment of the present invention, a method and associated system is provided for collecting data for a restaurant operator to measure and improve an outlet's service speed, e.g., at the front counter. Although the description below is provided in the context of a fast food restaurant, it should be apparent to a person skilled in the art that the solution provided may be suitable and/or can be adapted for other types of commercial establishments, e.g., a retail operation or a bank branch.

Briefly, the system seeks to quantify the amount of time a service provider takes to complete a transaction. One or more cameras capture the scene of an area where customer orders are taken and order fulfillment activities are visible. Depending upon the layout of the establishment, a suitable number of cameras are used to ensure clear vision of the point of sale area and the area where the customer completes the transaction. In the case of a quick service restaurant, the area in front of the cash register system (or point-of-sale POS system) and the area where customers receive their food orders are areas to be within the field of view of the camera(s). In some restaurants, the POS area and the area where a transaction is competed are the same or, in some configurations, these areas overlap.

It should be clear that a single camera or multiple cameras with or without overlapping fields of view may be used. Using a trained classifier, the customers are detected in each frame of each view. This can be done at any frame rate, the frame rate defining the smallest time increment to be used for time estimations.

Depending on the customer views available, the classifier can be trained to detect:
 i) people;
 ii) upper-bodies (head and shoulder);
 iii) faces/heads.

All camera classifiers preferably operate on the same segments but may be trained using various viewpoints.

Each detection (whether the item being detected is a whole person or a portion of a person) can be matched with a pool of previous detections associated with current customers. If none of the customers' images match the newly detected customer, then a new customer is detected. Thus, in its initial stages, the system "sees" or detects a customer at the service counter. The customer's characteristics (from the video frame at the counter) are then derived and these characteristics are stored in a database as being associated with a specific detected customer. For subsequent frames, if a customer is detected, the characteristics of this subsequently detected customer are then compared with the characteristics of the previously identified customer. If there is a match (or if there is a sufficient match), then it can be concluded that the subsequently detected customer is the previously detected customer. Of course, as noted above, if the subsequently detected customer does not match any of the previously detected customers, then it is concluded that a newly detected customer has been found. A new set of characteristics for the newly detected customer is then stored for comparison with later detected customers.

It should be clear that if a detection is matched with an existing customer, then this image is added to its pool of detected customer images. The customer's images are aggregated to form a customer's appearance model. A successful match of a detected customer image with an existing customer model is called a re-identification.

A customer's detection and a customer's model are matched by using for example, color, shape, and texture attributes. A match score and a confidence score are associated with each measured attribute. A match score evaluates how similar a detected customer is to a customer's model.

A confidence score evaluates how confident the system is to have matched the detected customer with the right model. As an example, confidence will be low if several customers sharing the same color/shape/texture attributes are simultaneously visible.

If match score is low for all models, then the detected customer is considered to be a new customer. If this customer is not re-identified (i.e. if the customer model created for this new customer is not matched with a customer that has been detected) after a preset amount of time, e.g., 10, 20, or 30 seconds, then this detection is considered to be a false detection and the customer model is removed from the pool of detected customers. If confidence score is too low, then the customer associated activity time is ignored in order to avoid corrupting the system with erroneous statistics. The re-identification interval is adjusted as needed to calibrate accuracy.

If no re-identification has taken place within a preset amount of time, e.g., 5, 6, 7, 8, 9 or 10 minutes, a customer's inclusion in the active pool stops. Should the same person enter the cameras' field of view, the system will identify them as a new customer. The amount of time to maintain the customer model in the active pool is adjusted as needed to calibrate accuracy.

Various outputs can be determined by the disclosed system and methods. Activity time is estimated by measuring the timespan between specific detections or actions of a re-identified customer. Service time can be estimated by measuring the time between the first appearance of a customer at a cash/POS area and last re-identification occurrence of this customer. Similarly, service time can also be estimated by measuring the time between the first appearance of a customer at a cash/POS area and the re-identification of the same customer during the detection of a pick-up event. As well, service time can be estimated by measuring the time between the appearance of a customer when a cash signal has been received and the last re-identification occurrence of this customer. Wait times can be estimated by measuring the time between the first appearance (or detection) of a customer in the monitored scene and the first appearance (or detection) of this customer at a cash area. Furthermore, queue time can be measured from the first identification of a customer to the time the same customer reaches the edge of the front counter. Order time can be the timespan between a customer reaching the counter and having that customer's order finalized at the cash register. Fulfillment time can be the timespan between the end of the order time and the time when the customer is given their order (i.e. the time that pick-up event occurs). Total service time is the sum of the order time and fulfillment time. A sum of all three can be tracked (activity time).

According to one embodiment of the present invention, a system is provided having four principal components: a people detection module, a people re-identification module, an action recognition module and an IP video capture component (see FIG. 1). Of course, the various modules can be software modules being executed by one or more data processors.

The people detection module processes video sequences with the goal of detecting customers standing at an area of interest, e.g., the front counter of a retail establishment. The customer can be, in the context of a QSR, ordering meals. The customer can also be waiting for their order or collecting their order.

The re-identification module aims to identify specific diners at different moments, particularly when they are ordering, picking up their order, or transitioning between the two events. This module can identify customers regardless of their location as long as they are located within the area of interest and are within the field of view of the one or more cameras.

The action recognition module is designed to automatically recognize human actions using visual clues. This module estimates, based on customers' actions, the moment of service fulfillment, i.e., when a tray or bag of food is collected by the customer.

Figure 4:
FIG. 4 shows an exemplary user interface with the panel on the left showing an active search area and detections, the panel on the right showing the model used to re-identify customers as they wait for their order, and the lower panel showing the service time calculated by the system.

The IP video capture component provides the structure for the other components and modules and may include the data processor and the various cameras used. This component operates as the central control flow manager of the whole system, and also manages internal message exchanges between the components. Similarly, this component manages the interaction between the users and the system via a graphic user interface (GUI). An example of such a GUI is shown in FIG. 4.

Figure 2A:
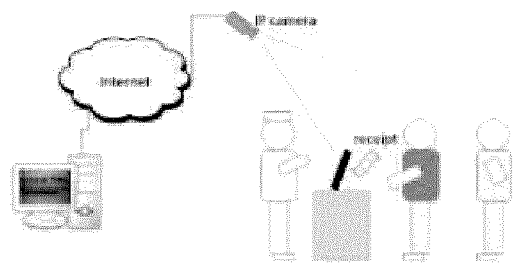
FIGS. 2A-2D illustrate a flowchart of process steps for implementing one embodiment of the subject invention.
Figure 2B:
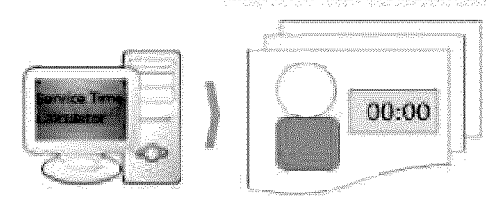
Figure 2C:
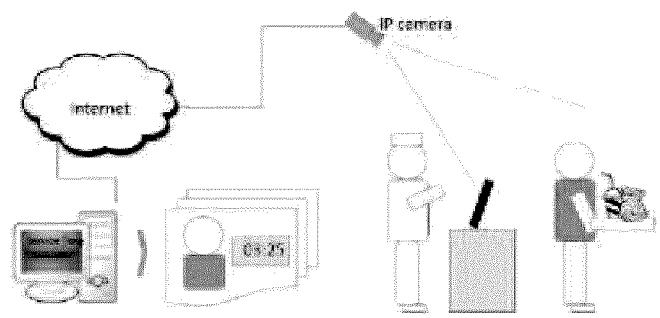

FIGS. 2A-2D illustrate diagrams detailing the steps in a method according to one aspect of the present invention. For FIGS. 2A-2D, the example is in the context of a fast food restaurant. When a print receipt signal is cast, the system tries to detect the person standing at the front of the line (FIG. 2A). If a person is successfully detected, a template for that customer is generated and saved in a list of known customers which keeps, for a preset amount of time, (e.g., 10 minutes) visual models of customers that have ordered a meal. A timer starts counting the service time for this customer (FIG. 2B) once the customer has been detected and the receipt has been printed. When a customer collects his food, this event is detected by the action recognition module. The customer, when standing at the front counter and after collecting his food, is matched with those in the list of known customer. If the matching succeeds, the chronometer is stopped for that customer, thereby estimating the amount of time to serve this customer. The re-identification module continuously updates the service time for all known customers (FIG. 2C).

Figure 2D:
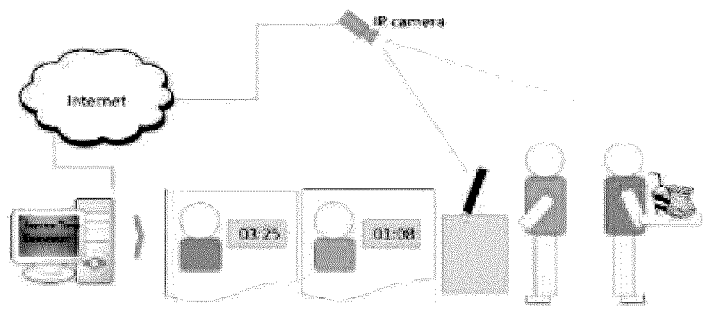

It should be clear that if the system does not detect the customer collecting his food, the system operates to estimate the service time based on the last time that specific customer was detected. If, after a preset amount of time (e.g., 10 minutes), and before the customer is deleted from the stored list, the chronometer time is kept, this value represents the last time that a particular customer was seen at the counter, so it is assumed that at that time the customer collected his meal and left (FIG. 2D).

In one particular implementation, when a print receipt signal is sent from the POS, the system tries to detect the customer standing at the front of the line. If a customer is successfully detected, a template for that customer is generated and saved in a list of known customers. The template for each customer is kept for a predefined duration, e.g., 10 minutes, in the system. A timer is started once the customer has been detected at the POS and is associated with the detected customer.

In this particular implementation, if a customer is not identified or associated with an existing template at least 15 times in the first 30 seconds, that customer's template is deleted.

Note that, for this implementation, the event of the customer collecting his food is detected by the system using the action recognition module. Once this has been detected, the detected customer standing at the counter is then matched with customers in the list of known customers (i.e. previously detected customers for which there is an existing customer template). If the customer is matched with an existing customer template, the chronometer associated with the matched customer template is stopped and the customer's service time is estimated based on the time the customer was detected at the counter and the time that the customer was detected collecting his food.

It should be clear that the re-identification module continuously updates the service time for all known customers. After 10 minutes from the time the customer template has been created or from the time the customer template was accessed or matched, each customer template which has not been matched with a customer is deleted from the list. When this occurs, the last recorded timestamp for the customer associated with the customer template about to be deleted is used to estimate that customer's service time. This last recorded timestamp represents the last time that a particular customer was detected at the counter. The assumption is that the customer associated with the customer template to be deleted has collected his meal and has left the cash/POS area.

Figure 3:
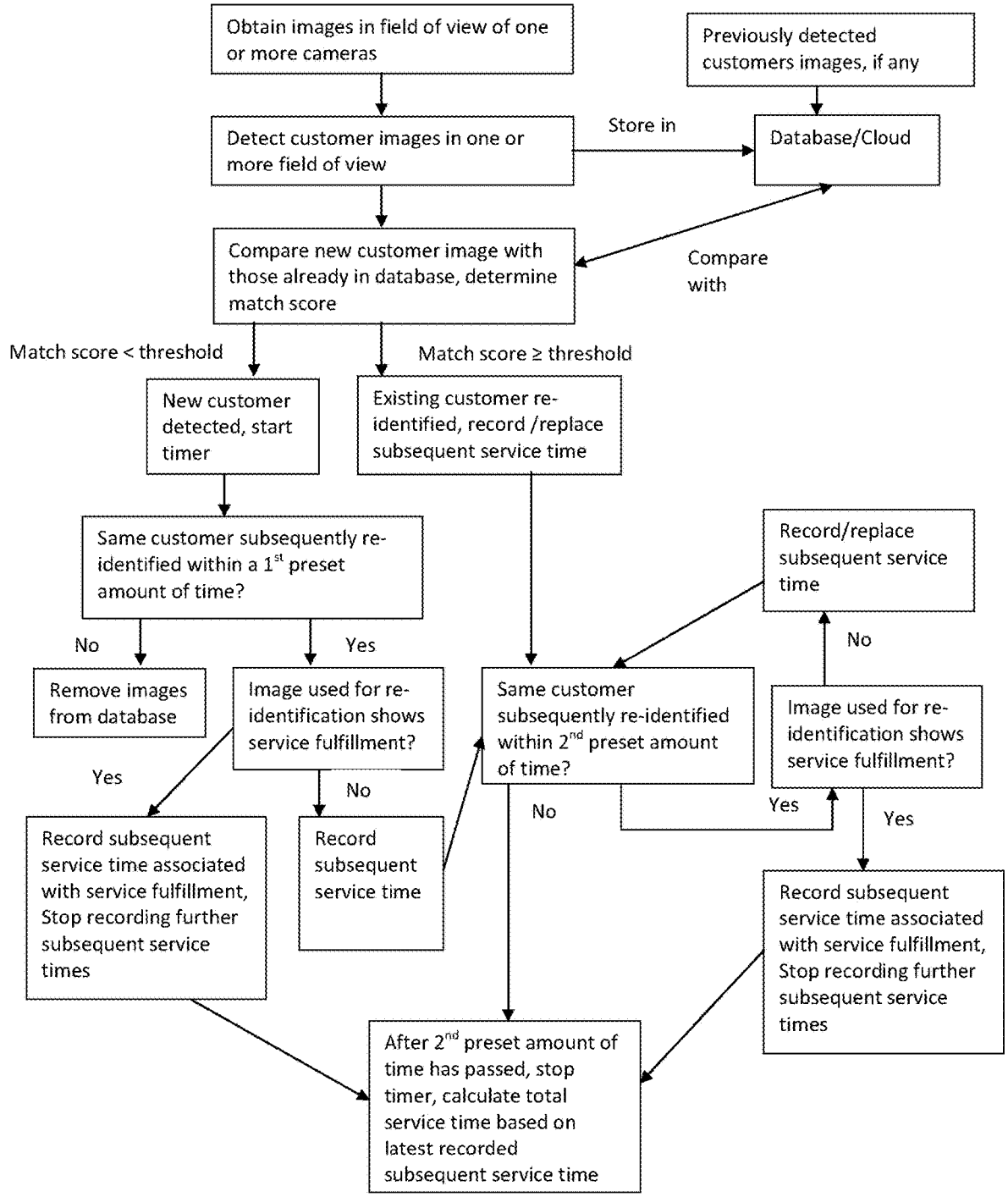
FIG. 3 shows a flowchart of process steps for implementing another embodiment of the subject invention.

With reference to FIG. 3, a flowchart detailing the steps in a method according to another aspect of the invention is illustrated. The method is for measuring service time in a commercial establishment. The steps include:

(a) providing one or more cameras in an interior of the commercial establishment, each camera having a field of view;

(b) continuously obtaining, in real time, images within the field of view using said one or more cameras;

(c) detecting an image of a human customer in said field of view and identifying the image of the human customer as a customer image;

(d) storing the customer image in a database;

(e) comparing the customer image identified in step (c) with one or more customer images stored in the database to determine a match score between the customer image identified in step (c) and each customer image stored in the database, and to determine a maximum match score;

(f) i) if the maximum match score is below a threshold match score, identifying the human customer as a new customer, and starting a timer associated with the new customer, or
   ii) if the maximum match score is at or above the threshold match score, recording the time the customer image identified in step (c) was detected as a subsequent service time associated with an existing customer, wherein the existing customer is associated with the customer image in the database with which the customer image identified in step (c) has the maximum match score;
(g) i) if in step (e) a new customer is identified, but the new customer is not re-identified within a first preset amount of time, removing any customer image of the new customer from the database, or
   ii) if in step (e) a new customer is identified, and the new customer is re-identified within the first preset amount of time, recording a subsequent service time associated with the new customer each time the new customer is re-identified, within a 2nd preset amount of time, until re-identification of said new customer takes place with a customer image associated with service fulfillment, or
   iii) if in step (e) an existing customer is re-identified, recording a further subsequent service time associated with the existing customer each time the existing customer is re-identified, within the 2nd preset amount of time, until re-identification of said existing customer takes place with a customer image associated with service fulfillment;
(h) stopping the recording of further subsequent service times if the new customer or existing customer is re-identified with a customer image associated with service fulfillment;
(i) stopping the timer associated with the new customer or an timer associated with the existing customer once the timer reaches a second preset amount of time; and
(j) after the timer reaches the second preset amount of time, calculating a service time associated with the new customer or exiting customer using the latest recorded subsequent service time.

This disclosure further provides for an apparatus and/or system comprising a component or a combination of components which perform the method as described herein.

In an embodiment, the methods as described herein may be computer implemented method comprising one or more data feed mechanisms that may be executable by computer software stored on a non-transitory storage medium utilized by the system and/or method.

In an embodiment of the present invention, the systems and methods may comprise a non-transitory computer-readable medium with instructions stored thereon, that when executed by a microprocessor, perform steps of the claimed method or a portion thereof. A memory, digital storage device and/or non-transitory computer readable medium, which may be accessed and/or executed by a microprocessor incorporated into or included within the claimed system and/or method, may have stored thereon executable ingestion and/or dissemination instructions, one or more ingestion and/or dissemination computer programs, one or more ingestion and/or dissemination algorithms and/or ingestion and/or dissemination software (hereinafter "ingestion and/or dissemination instructions") that, when executed by the microprocessor, perform the one or more computer implemented steps of the claimed method.

The invention as disclosed herein provides a number of advantages over prior art systems and methods. First, by having an automated system at the front counter, the detection rate and accuracy of total transaction time is improved over manual methods relying on judgments of human employees. Multiple customers can be tracked at the same time, and more data points of total transaction time can be obtained. More service speed data at the front counter can assist the restaurant operator in identifying areas requiring improvement, and address such areas such as by developing new procedures or reallocating labor resources, thereby improving operational performance. In addition, as operators improve the restaurant's service speed at the front counter, customer satisfaction with the restaurant and/or restaurant brand/concept is expected to improve, thereby increasing business. The system can be set up in fast food restaurants using existing video surveillance cameras, thereby further reducing costs.

As noted above, aside from the IP camera component, the other main components of the system are the people detector component, the re-identification component, and the action recognition component. Below are details regarding these components.

People Detector

The people detector component aims at detecting customers standing at the front counter of a fast food restaurant. The component receives as an input a video sequence of customers ordering meals in a restaurant, and as an output the location of customers in each video frame. Due to restrictions imposed by the environment of restaurants, full-body appearance may not always be available in the video sequences as the counter blocks the camera view of the customers' lower bodies. As a result, the people detector can be designed to detect persons using only the appearance of their upper-bodies, i.e., head, shoulders and torso. This people detector component is constantly running in an independent thread, providing at all times the locations of customers in the field of view of the camera. This information is later used by the other components of the system.

The people detector can use combined Haar-like features and a two-level cascade classifier for detecting customers at the front counter.

Other implementations of the people detector may use gradient based features, shape based features, contextual features, automatically mined features, and/or convolutional neural networks to detect customers or people in the images/video frames. In another implementation, the feature used may be the Histogram of Oriented Gradient (HOG) as a descriptor for detected people/customers. This descriptor counts occurrences of gradient orientation weighted by gradient magnitude in rectangular regions of an image.

People Re-Identification (Re-ID)

This component is for identifying and matching individuals based on their physical appearance. In one implementation, the component is activated when a new order is placed in the Point of Sale (POS) software of the restaurant or when a new customer is identified by a lower-than-threshold match score. A signal is sent internally in the system that indicates to the re-identification module (Re-ID) that: a) a template for a new customer has to be created, b) the new template created has to be stored in a list of customers waiting on their order, and c) to set the service time for the new customer to zero.

Since templates for new customers that have not been re-identified within a preset amount of time (e.g. 10 minutes) are deleted, the Re-ID module can be called at any time by the video capture system for the task of identifying customers. When this occurs, the Re-ID module receives a picture or video frame of a customer and the Re-ID module attempts to match the picture/frame of the customer with an internal list/database of known customers. If the matching succeeds, the service time of the matched customer in the list/database is updated and the new time is returned. If the matching does not succeed, the Re-ID module returns a message indicating that there is no entry for the particular customer in the picture/frame. When this occurs, a new customer template can be then created.

In one implementation, the Re-ID module uses three thresholds for matching: one for re-identification, one for adding models (lower than the first threshold used for re-identification) and one for adding new customers. For each customer template created, the Re-ID module is executed once again against the existing templates to detect duplicates. Whenever two templates have a similarity score lower than a predetermined fusion threshold, the newer template is added or fused with the older template and the newer template is then deleted. This avoids or seeks to avoid duplicate customer templates.

Action Recognition (AR)

The action recognition (AR) module identifies specific customer actions and executes specific instructions when such actions are identified. In one implementation, the AR module is configured to detect customers collecting their order, turning around, and leaving. When these actions are identified or recognized, the timer/chronometer associated with the customer performing these actions is stopped. As can be imagined, this module is useful in estimating the service time because when a customer leaves, this indicates that the service has been completed/provided and, as such, the stopwatch associated with that customer should be stopped.

It should be clear that many alternatives are possible for the AR module. Different feature descriptors may be used to efficiently encode motion information from video sequences. Such encoded motion information allows machine learning algorithms to discriminate activities among different classes.

IP Video Capture (IPVC) Component

The IPVC component is a framework that provides the structure for the other system components and is the center in the information or message flow for the entire system. The function of the IPVC component includes: collecting image frames from one or more cameras connected to the IPVC by way of a data network (e.g., the Internet, a local area network, a wide area network) and supplying the video information to the system modules so that the video information may be processed. Of course, the IPVC may also be directly connected to the one or more cameras. Also, the IPVC component manages the internal message passing among the various components and between the users and the system via a graphic user interface (GUI). This component can have two video buffers of different resolutions and channels (color and grayscale), thereby permitting video information to be provided according to the requirements of the various other modules of the system.

In one embodiment, the IPVC component responds to a print receipt event by running the people detector module, whose work is to find customers at the front counter in the region close to the cash register that cast the event. If a person is detected, a template for that customer is generated and saved in a list of known customers. The list of known customers is a data structure that keeps visual models of customers that have placed their order. The list keeps information of each customers for a preset amount of time, e.g., 10 minutes, after which the template is removed. When a person is added to the list, a timer stars counting the service time for that customer.

In order to stop the timer that measures the service time, two options are available. The first option is to use the action recognition module while the second option is to use the re-identification module.

With the first option noted above, the action recognition module is used to detect a service fulfillment event (e.g., a food pick up). After this, a match is attempted between the customer standing at the front counter and the customers in the list of known customers. This produces a set of candidates (i.e., customers that have probably collected their food). One of these candidates is selected and the chronometer for this selected candidate on the list is stopped, thereby obtaining this customer's service time. To select one person from the group of candidates, a simple FIFO (first-in first-out) strategy can be applied. With such a strategy, whichever is the earliest customer in the list is the candidate selected.

For the second option, the system uses the re-identification module to continuously update the service time for all known customers in the list. The Re-ID module is executed so that every time a person is successfully recognized as one in the list of known customers, that customer's service time is updated. Then, after a preset amount of time (and before the customer is deleted from the list) that customer's service time is kept or saved. This service time represents the time elapsed between the first detection of that customer and the last time that particular customer was seen at the counter. Thus, it is assumed that at that time the customer collected his meal and left.

Figure 5:
FIG. 5 shows a user interface used in one implementation of the present invention.

As part of the IPVC, a suitable user interface may be used. In one implementation, users interact with the system by using the interface shown in FIG. 5. This user interface has several panels, a main one being the camera display on the top. This panel displays the live stream video(s) (up to two live streams) and a set of bounding boxes indicating the search areas and detections. The largest box defines the active search area, the region in which the system looks for customers. Inside this active search area, there may be one or more green rectangles which correspond to the search area by a cash register. These regions can be adjusted according to the location of the camera, number of cash registers, and field of view. Such adjustability allows for the system to properly detect customers.

In this user interface, when a customer is automatically detected, he/she is enclosed in a red bounding box. A model based on the visual features of the detection is then created when the customer's receipt is printed. The panel on the right of the figure shows the model of the customer. It should be clear that this panel on the right may not be present in some implementations of the system. In the upper left corner of each cashier area, a dollar sign is displayed when the corresponding cash register prints a receipt. In automatic events mode, this dollar sign is printed for every loop, as the system attempts to create as many events as there are overlapping detections with every cashier area. Note that some of the configurable parameters visible in the user interface may not be present in some implementations of the system as they may not be necessary for the system to operate properly.

System Output

The system can output a service time calculated by measuring, for each customer, the time between two events, e.g., ordering and collection of food. This output is possible because the system properly identifies individual customers based on their appearance.

Finally, the combination of any embodiment or feature mentioned herein with one or more of any of the other separately mentioned embodiments or features is contemplated to be within the scope of the instant invention. Any embodiment or feature mentioned herein with respect to the disclosed method is envisioned to be equally applicable to the apparatus and system provided hereinabove.

REFERENCES

Disclosures of the publications cited in this section, in their entireties, are hereby incorporated by reference into this application in order to more fully describe the state of the art as of the date of the invention described herein.

[1] N. Dalal and B. Triggs, "Histograms of oriented gradients for human detection," in *IEEE Computer Society Conference on Computer Vision and Pattern Recognition, CVPR.*, San Diego, 2005.

[2] P. Sabzmeydani and G. Mori, "Detecting Pedestrians by Learning Shapelet Features," in *IEEE Conference on Computer Vision and Pattern Recognition, CVPR '07*, Minneapolis, Minn., 2007.

[3] S. Zhang, C. Bauckhage and A. B. Cremers, "Informed Haar-like Features Improve Pedestrian Detection," in *IEEE Conference on Computer Vision and Pattern Recognition (CVPR)*, 2014.

[4] Y. Ding and J. Xiao, "Contextual boost for pedestrian detection," in *2012 IEEE Conference on Computer Vision and Pattern Recognition (CVPR)*, Providence, R.I.

[5] P. Dollar, Z. Tu, H. Tao and S. Belongie, "Feature Mining for Image Classification," in *IEEE Conference on Computer Vision and Pattern Recognition, 2007. CVPR '07*, Minneapolis, 2007.

[6] P. Sermanet, K. Kavukcuoglu, S. Chintala and Y. LeCun, "Pedestrian detection with unsupervised multi-stage feature learning," in *IEEE Conference on Computer Vision and Pattern Recognition*, 2013.

[7] Z. Lin and L. S. Davis, "A Pose-Invariant Descriptor for Human Detection and Segmentation," in *European Conference on Computer Vision*, 2008.

[8] T. Ahonen, A. Hadid and M. Pietikainen, "Face description with local binary patterns: Application to face recognition," *IEEE TRANSACTIONS ON PATTERN ANALYSIS AND MACHINE INTELLIGENCE*, vol. 28, no. 12, p. 2037-2041, 2006.

[9] X. Wang, T. X. Han and S. Yan, "An HOG-LBP Human Detector with Partial Occlusion Handling," in *IEEE International Conference on Computer Vision*, 2009.

[10] P. F. Felzenszwalb, R. B. Girshick, D. McAllester and D. Ramanan, "Object Detection with Discriminatively Trained Part-Based Models," *IEEE Transactions on Pattern Analysis and Machine Intelligence*, vol. 32, no. 9, pp. 1627-1645, 2010.

[11] P. Dollar, Z. T. Tu, P. Perona and S. Belongie, "Integral channel features," in *British Machine Vision Conference*, 2009.

[12] R. Benenson, M. Mathias, T. Tuytelaars and L. Van Gool, "Seeking the Strongest Rigid Detector," in *IEEE Conference on Computer Vision and Pattern Recognition*, Portland, Oreg., 2013.

[13] J. J. Lim, C. L. Zitnick and P. Dollar, "Sketch tokens: A learned mid-level representation for contour and object detection," in *IEEE Conference on Computer Vision and Pattern Recognition*, 2013.

[14] P. Viola and M. J. Jones, "Robust real-time face detection," *International journal of computer vision*, vol. 57, no. 2, p. 137-154, 2004.

[15] A. a. S. K. S. Bedagkar-Gala, "A survey of approaches and trends in person reidentification," in *Image and Vision Computing*, 2014.

[16] M. Farenzena, L. Bazzani, A. Perina, V. Murino and M. Cristani, "Person Re-Identification by Symmetry-Driven Accumulation of Local Features," in *IEEE Conference on Computer Vision and Pattern Recognition (CVPR)*, San Francisco, 2010.

[17] D. Gray, S. Brennan and H. Tao, "Evaluating appearance models for recognition, reacquisition and tracking," in *PETS*, 2007.

[18] U. H. Office, "i-LIDS multiple camera tracking scenario definition," [Online]. Available: https://www.gov.uk/imagery-library-for-intelligent-detection-systems. [Accessed September 2014].

[19] A. Ess, B. Leibe and L. V. Gool, "Depth and appearance for mobile scene analysis," in *ICCV*, 2007.

[20] J. Zhu, B. Wang, X. Yang, W. Zhang and Z. Tu, "Action Recognition with Actons," in *IEEE International Conference on Computer Vision (ICCV)*, Sydney, 2013.

[21] F. Shi, R. Laganiere and E. Petriu, "LPM for Fast Action Recognition with Large Number of Classes," in *ICCV Workshop on Action Recognition with a Large Number of Classes*, 2013.

[22] F. Shi, R. Laganiere and E. Petriu, "Gradient Boundary Histograms for Action Recognition," in *IEEE Winter Conference on Applications of Computer Vision (WACV)*, 2015.

[23] H. Wang and C. Schmid, "Action recognition with improved trajectories," in *IEEE International Conference on Computer Vision, ICCV 2013*, Sydney, 2013.

[24] F. Shi, E. Petriu and R. Laganiere, "Sampling strategies for real-time action recognition," in *IEEE Conference on Computer Vision Pattern Recognition (CVPR)*, Portland, 2013.

[25] H. Wang, A. Klaser, C. Schmid and L. Cheng-Lin, "Action Recognition by Dense Trajectories," in *IEEE Conference on Computer Vision & Pattern Recognition*, Colorado Springs, 2011.

[26] D. Oneata, J. Verbeek and C. Schmid, "Action and Event Recognition with Fisher Vectors on a Compact Feature Set," in *IEEE International Conference on Computer ICCV*, Sydney, 2013.

[27] I. Laptev, M. Marszalek, C. Schmid and B. Rozenfe, "Learning realistic human actions from movies," in *IEEE Conference on Computer Vision and Pattern Recognition, 2008. CVPR 2008*, Anchorage, 2008.

[28] A. Klaser, M. Marszalek and C. Schmid, "A Spatio-Temporal Descriptor Based on 3DGradients," in *British Machine Vision Conference*, Leeds, 2008.

[29] P. Scovanner, S. Ali and M. Shah, "A 3-Dimensional SIFT Descriptor and its Application to Action Recognition," in *Proceedings of the 15th International Conference on Multimedia*, Augsburg, 2007.

[30] D. G. Lowe, "Distinctive image features from scale-invariant Keypoints," *International Journal of Computer Vision*, vol. 60, no. 2, pp. 91-110, 2003.

[31] F. Shi, PhD thesis: Local Part Model for Action Recognition in Realistic Videos, Ottawa, Canada: University of Ottawa, 2014.

[32] S. Walk, N. Majer, K. Schindler and B. Schiele, "New Features and Insights for Pedestrian Detection," in *IEEE Conference on Computer Vision and Pattern Recognition (CVPR)*, San Francisco, 2010.

[33] P. Dollar, C. Wojek, B. Schiele and P. Perona, "Pedestrian detection: An evaluation of the state of the art," *IEEE*

*Transactions on Pattern Analysis and Machine Intelligence*, vol. 34, no. 4, p. 743-761, 2012.

[34] P.-E. Forssen, "Maximally Stable Colour Regions for Recognition and Matching," in *IEEE Computer Society Conference on Computer Vision and Pattern Recognition (CVPR 2007)*, Minneapolis, 2007.

[35] Y. Xie, H. Yu, X. Gong, Z. Dong, Y. Gao, Learning Visual-Spatial Saliency for Multiple-Shot Person Re-Identification, *IEEE Signal Processing Letters*, January 2015

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C") or an object-oriented language (e.g., "C++", "java", "PHP", "PYTHON", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for determining a time for delivering service to customers, the system comprising:
    at least one video camera having a field of view encompassing a service counter;
    at least one data processor for continuously receiving multiple video frames from said at least one video camera;
    a people detection module for detecting customers within said video frames, for determining that a customer is at said service counter, and for determining characteristics of said customer, wherein said characteristics of said customer are determined from portions of said video frames showing a head, shoulders, and torso of said customer, and wherein said characteristics are represented as a first Histogram of Oriented Gradients (HOG) for said customer;
    a re-identification module for matching detected customers with previously detected customers by subsequently identifying said customer in at least one non-consecutive video frame received from said at least one video camera, wherein said at least one non-consecutive video frame is non-consecutive with a video frame in which said customer was initially detected and wherein said customer is considered to be subsequently identified when a second HOG matches said first HOG, said second HOG being derived from said at least one non-consecutive video frame; and
    an action recognition module for determining that said detected customer has completed receiving service, wherein said action recognition module performs its determination based only on image contents of at least one image associated with service fulfillment, said at least one image being at least one of said video frames,
    wherein an elapsed time between said customer arriving at said service counter and said customer completing receiving service is determined by said data processor.

2. The system according to claim 1, further comprising storage media for storing said elapsed time for multiple customers.

3. The system according to claim 1, wherein said data processor starts a chronometer when a specific service related event occurs and stops said chronometer when said customer has completed receiving service.

4. The system according to claim 1, wherein said image associated with service fulfillment shows said customer picking up an order.

5. The system according to claim 1, further comprising a video capture component for capturing video frames from said at least one video camera.

6. The system according to claim 1, wherein said people detection module detects customers based on an upper body area of customers.

7. The system according to claim 1, wherein said people detection module detects customers behind said service counter.

8. A method for determining a time for delivering service to a customer at a service counter, the method comprising:
    (a) at a data processor, continuously receiving multiple video frames from said at least one video camera;
    (b) processing said video frames to determine that a customer is at said service counter;
    (c) determining characteristics of said customer at said service counter in a specific one of said video frames, said characteristics of said customer being determined from portions of said video frames showing a head, shoulders, and torso of said customer, and said characteristics being represented as a first Histogram of Oriented Gradients (HOG) representing said customer;

(d) from at least one different frame of said video frames, said at least one different frame being non-consecutive with said specific video frame, determining a second HOG representing an individual in said at least one different frame, (e) matching said second HOG from step (d) to said first HOG from step (c), to thereby identify said customer in said at least one different one of said video frames;

(f) determining, based only on image contents of said at least one different one of said video frames, that said customer has completed receiving service, said at least one of said video frames being an image associated with service fulfillment; and (g) determining an elapsed time between steps (b) and (e).

9. The method according to claim 8, wherein step (d) comprises detecting a detected customer behind said service counter and determining that said customer was previously identified.

10. The method according to claim 9, further comprising, in the event said detected customer is not matched with a previously identified customer, creating a customer template for said detected customer.

11. The method according to claim 8, wherein step (f) comprises starting a timer when a customer is detected at a point of sale terminal at said service counter and stopping said timer when said customer has completed receiving service.

12. The method according to claim 8, wherein said image associated with service fulfillment shows said customer picking up an order.

13. Non-transitory computer-readable media having encoded thereon computer-readable and computer-executable instructions that, when executed, implement a method for determining a time for delivering service to a customer at a service counter, the method comprising:

(a) at a data processor, continuously receiving multiple video frames from said at least one video camera;

(b) processing said video frames to determine that a customer is at said service counter;

(c) determining characteristics of said customer at said service counter in a specific one of said video frames, said characteristics of said customer being determined from portions of said video frames showing a head, shoulders, and torso of said customer, and said characteristics being represented as a first Histogram of Oriented Gradients (HOG) representing said customer;

(d) from at least one different frame of said video frames, said at least one different frame being non-consecutive with said specific video frame, determining a second HOG representing an individual in said at least one different frame, (e) matching said second HOG from step (d) to said first HOG from step (c), to thereby identify said customer in said at least one different one of said video frames;

(f) determining, based only on image contents of said at least one different one of said video frames, that said customer has completed receiving service, said at least one of said video frames being an image associated with service fulfillment; and (g) determining an elapsed time between steps (b) and (e).

* * * * *